(12) United States Patent
Barrett et al.

(10) Patent No.: US 12,153,385 B2
(45) Date of Patent: Nov. 26, 2024

(54) METHODS AND SYSTEMS TO ADAPT PID COEFFICIENTS THROUGH REINFORCEMENT LEARNING

(71) Applicants: Sony Group Corporation, Tokyo (JP); Sony Corporation of America, New York, NY (US)

(72) Inventors: Samuel Barrett, Cambridge, MA (US); James MacGlashan, Riverside, RI (US); Varun Kompella, Kanata (CA); Peter Wurman, Acton, MA (US); Goker Erdogan, London (GB); Fabrizio Santini, Arlington, MA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 377 days.

(21) Appl. No.: 17/314,351

(22) Filed: May 7, 2021

(65) Prior Publication Data
US 2022/0365493 A1   Nov. 17, 2022

(51) Int. Cl.
G05B 13/02 (2006.01)
G05B 6/02 (2006.01)
G06N 20/00 (2019.01)

(52) U.S. Cl.
CPC .......... G05B 13/0265 (2013.01); G05B 6/02 (2013.01); G06N 20/00 (2019.01)

(58) Field of Classification Search
None
See application file for complete search history.

(56) References Cited

U.S. PATENT DOCUMENTS 9,082,079 B1 * 7/2015 Coenen ................ G06N 3/049
11,579,569 B2 * 2/2023 Lee ........................ G05B 6/02
(Continued)

FOREIGN PATENT DOCUMENTS

CN    103853046 A    6/2014
CN    107943022 A    4/2018
(Continued)

OTHER PUBLICATIONS

Qifeng Sun, et al., "Design and application of adaptive PID controller based on asynchronous advantage actor-critic learning method", Dec. 2019, Springer.
(Continued)

*Primary Examiner* — David Earl Ogg
(74) *Attorney, Agent, or Firm* — INNOVATION CAPITAL LAW GROUP, LLP; Vic Lin

(57) ABSTRACT

Systems and methods are used to adapt the coefficients of a proportional-integral-derivative (PID) controller through reinforcement learning. The approach for adapting PID coefficients can include an outer loop of reinforcement learning where the PID coefficients are tuned to changes in the environment and an inner loop of PID control for quickly reacting to changing errors. The outer loop can learn and adapt as the environment changes and be configured to only run at a predetermined frequency, after a given number of steps. The outer loop can use summary statistics about the error terms and any other information sensed about the environment to calculate an observation. This observation can be used to evaluate the next action, for example, by feeding it into a neural network representing the policy. The resulting action is the coefficients of the PID controller and the tunable parameters of things such as the filters.

21 Claims, 3 Drawing Sheets

(56) References Cited

U.S. PATENT DOCUMENTS

| | | | |
|---|---|---|---|
| 2017/0261946 A1* | 9/2017 | Mori | G05B 13/024 |
| 2018/0210406 A1 | 7/2018 | Shimizu et al. | |
| 2019/0064753 A1* | 2/2019 | Zhang | A01G 9/24 |
| 2019/0187631 A1* | 6/2019 | Badgwell | G06N 3/006 |
| 2021/0132552 A1* | 5/2021 | Lawrence | G05B 13/0265 |
| 2021/0341895 A1* | 11/2021 | Havlena | G05B 19/0425 |

FOREIGN PATENT DOCUMENTS

| | | |
|---|---|---|
| JP | 2018120357 A | 8/2018 |
| WO | 2019193678 A1 | 10/2019 |

OTHER PUBLICATIONS

Wang, et al., A Proposal of Adaptive PID Controller Based on Reinforcement Learning, Journal of China University of Mining and Technology, vol. 17, Issue 1, Mar. 2007, pp. 40-44.

International Search Report & Written Opinion dated Apr. 21, 2022 from corresponding PCT Application No. PCT/US2022/070214.

Anonimous: "PIO Controller",Wikipedia, Sep. 5, 2017 (Sep. 5, 2017), pp. 1-17, XP055418467,[retrieved on Oct. 24, 2017].

Wang, Xuan et al: "Control of superheat of organic Rankine cycle undertransient heat source based on deep reinforcement learning", Applied Energy, Elsevier Science Publishers, GB,v .lo 278, (Aug. 4, 2020), XP086369652,ISSN: 0306-2619, DOI: 10.1016/J.APENERGY. 2020.115637[retrieved on Aug. 4, 2020].

Yu, Xinyi et al: "A Self-adaptive SAC-PID Control Approach based on Reinforcement Learning for Mobile Robots", arxiv.org, Cornell University Library, 201 Olin Library Cornell University Ithaca, NY 14853, (Mar. 19, 2021),XP081913332,* the whole document*

* cited by examiner

METHODS AND SYSTEMS TO ADAPT PID COEFFICIENTS THROUGH REINFORCEMENT LEARNING

BACKGROUND OF THE INVENTION

1. Field of the Invention

Embodiments of the invention relates generally to machine learning systems and methods. More particularly, the invention relates to systems and methods for adapting coefficients of a proportional-integral-derivative (PID) controller using reinforcement learning.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

A PID controller is a control mechanism used to achieve a specific control value given the current error of the value. A PID controller has a number of parameters (the coefficients) that are necessary to tune for the specific situation. PID controllers are often combined with filters on the perceived values, such as low-pass filters. These filters also have parameters, such as the poles on a low pass filter, that need to be tuned. While there are existing rules of thumb for tuning these parameters, they usually require fine tuning, either by hand or through automated tuning. In addition, these parameters are specific to the conditions under which they are operating and, if those conditions change, they need to be re-tuned.

FIG. 1 illustrates a typical PID controller schematic diagram. A PID controller 100 continuously calculates an error value as the difference between a desired setpoint (SP) and a measured process variable (PV), and applies a correction based on proportional, integral, and derivative terms. The controller attempts to minimize the error over time by adjustment of a control variable, such as process temperature, reagent control, or the like, to a new value determined by a weighted sum of the control terms.

The term P is proportional to the current value of the SP-PV error $e(t)$. For example, if the error is large and positive, the control output will be proportionately large and positive, taking into account the gain factor K. Using proportional control alone will result in an error between the setpoint and the actual process value, because it requires an error to generate the proportional response. If there is no error, there is no corrective response.

The term I accounts for past values of the SP-PV error and integrates them over time to produce the I term. For example, if there is a residual SP-PV error after the application of proportional control, the integral term seeks to eliminate the residual error by adding a control effect due to the historic cumulative value of the error. When the error is eliminated, the integral term will cease to grow. This will result in the proportional effect diminishing as the error decreases, but this is compensated for by the growing integral effect.

The term D is a best estimate of the future trend of the SP-PV error, based on its current rate of change. It is sometimes called anticipatory control, as it is effectively seeking to reduce the effect of the SP-PV error by exerting a control influence generated by the rate of error change. The more rapid the change, the greater the controlling or dampening effect.

Loop tuning can be performed to produce the optimal control function. The tuning constants are shown below as K and must be derived for each control application, as they depend on the response characteristics of the complete loop external to the controller.

In view of the foregoing, it is clear that there is a need for an algorithm can use machine learning to efficiently adapt PID coefficients.

SUMMARY OF THE INVENTION

An alternative approach to solving control problems is to treat them as learning problems. Reinforcement learning (RL) models these problems as sequential decision making problems and learns about the long term effects of actions. In order to handle complex problems, RL approaches generally use function approximation to aid with generalization and speed up learning. In particular, neural networks are often used as the function approximators. RL approaches can learn to control complex systems in a variety of scenarios, but these function approximators are often expensive to calculate. Specifically, on systems with limited computational resources, these function approximators may not be possible to evaluate in real time.

PID controllers, on the other hand, offer rapid changes and can be easy to compute. Aspects of the present invention combine the strengths of both approaches—it uses PID controllers to run in real time and RL approaches to adapt the PID coefficients to changing situations. Specifically, the RL step can calculate the PID and filter coefficients. The RL step can be run at a lower frequency, which reduces computational costs and resources. Then, the PID step is run at higher frequency, allowing it to maintain control.

Embodiments of the present invention provide a reinforcement learning algorithm for automatically tuning proportional-integral-derivative (PID) coefficients, the algorithm performing the steps of operating a PID controller at a first frequency to minimize error between a variable setpoint and a process output; and operating a reinforcement learning model at a second frequency. The reinforcement learning model performs the following steps: receiving summary statistics about error terms from the PID controller and sensed information on the environment to calculate an observation; selecting an action based on the observation by feeding the observation into a policy, the action including changing PID coefficients; and updating the policy by a reward function derived from sensed information after the policy acts on the PID controller by updating the PID coefficients.

Embodiments of the present invention further provide a method of automatically adjusting coefficients of a proportional-integral-derivative controller comprising operating a reinforcement learning model to perform the following steps: receiving summary statistics about error terms from a PID controller and receiving sensed information on the environment to calculate an observation; selecting an action based on the observation by feeding the observation into a policy, the action including the changing PID coefficients; and updating the policy by a reward function derived from sensed information after the policy acts on the PID controller by updating the PID coefficients.

Embodiments of the present invention also provide a method of automatically adjusting coefficients of a proportional-integral-derivative controller comprising operating a PID controller at each time step to minimize error between a variable setpoint and a process output; and operating a reinforcement learning model after a plurality of time steps. The reinforcement learning model performs the following steps: receiving summary statistics about error terms from a PID controller and receiving sensed information on the environment to calculate an observation; selecting an action based on the observation by feeding the observation into a policy, the policy predicting results of the action, the action including the changing PID coefficients; and updating the policy by a reward function derived from sensed information after the policy acts on the PID controller by updating the PID coefficients.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
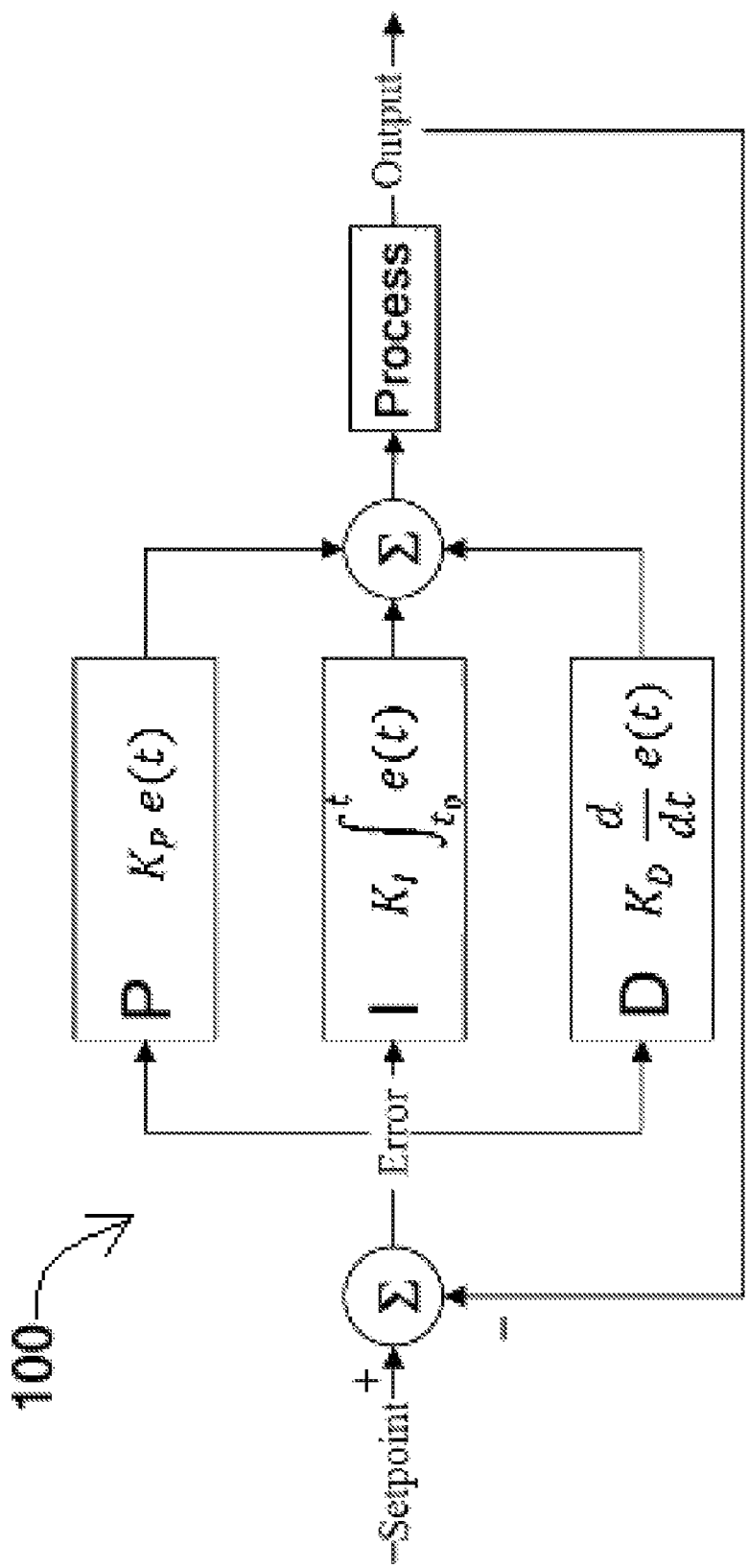
FIG. 1 illustrates a block diagram of a conventional PID controller.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Broadly, embodiments of the present invention provide a system and method for adapting the coefficients of a proportional-integral-derivative (PID) controller through reinforcement learning. The approach for adapting PID coefficients can include an outer loop of reinforcement learning where the PID coefficients are tuned to changes in the environment and an inner loop of PID control for quickly reacting to changing errors. The outer loop can learn and adapt as the environment changes and be configured to only run at a predetermined frequency, after a given number of steps. The outer loop can use summary statistics about the error terms and any other information sensed about the environment to calculate an observation. This observation can be used to evaluate the next action, for example, by feeding it into a neural network representing the policy. The resulting action is the coefficients of the PID controller and the tunable parameters of things such as the filters.

The learning can be updated using a reward function that is derived from similar information as the observation, such as being a sum of the errors seen over the freqRL steps of the inner loop. Over time, the reinforcement learning algorithm will converge to effective PID coefficients and filter parameters for the given state of the environment. The reward function can be, for example, based on one or more of minimizing error, minimizing control variable changes, and minimizing overshoot. Once the policy is trained, the trained policy can be deployed in a production environment to help control PID parameters.

However, the outer loop acts slowly and does not directly output the new control. The inner loop serves to adapt quickly to changes in the error term, ensuring smooth control. The PID loop is easy to compute and requires very little storage, which allows it to be computed easily at every time step. Unlike standard RL loops, there is an additional step where the observation and reward are updated with the error from the PID loop. Algorithm 1, below, describes the algorithm in detail.

The algorithm described herein allows for quick adaptation through the PID controller and for updating the parameters of a PID automatically as the situation requires. This algorithm combines the strengths of reinforcement learning, such as automatic tuning, with the strengths of PID controllers, such as fast computation and smooth control. The algorithm is able to be computed efficiently, while allowing control to be adapted to new situations.

---
Algorithm 1 Adaptive PID
---

Input: RL ← Reinforcement learning algorithm
Input: $cycle_{RL}$ ← Cycles that the RL algorithm acts
Input: $value_{target}$ ← Target value
Input: updateReward ← Calculates the reward function
  // Initialize everything
  $time_{prev}$ = getTime( )
  $error_{prev}$ = 0
  integral = 0

Figure 2:
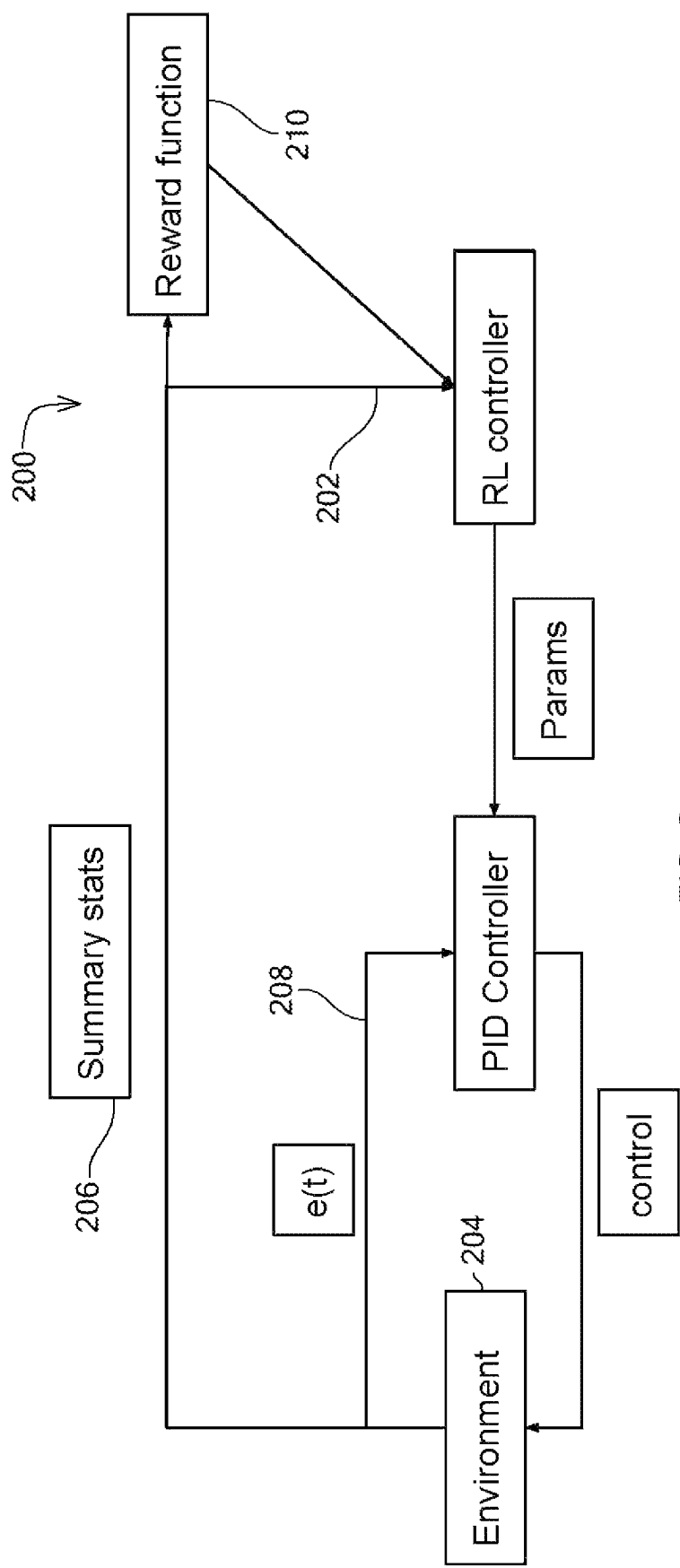
FIG. 2 illustrates a schematic representation of a control system according to an exemplary embodiment of the present invention.

---
Algorithm 1 Adaptive PID
--- observation.initialize( )
  reward = 0
  loop
    $k_p$; $k_i$; $k_d$ = RL.step(observation; reward ▷ Get new coefficients and update the RL
  algorithm
    observation.reset( )
    reward = 0
    for i ∈ {0, ... , $cycle_{RL}$} do
      $time_{current}$ , $value_{current}$ = getCurrent( )
      dt = $time_{current}$ − $time_{prev}$
      // Update the errors
      $error_{current}$ = $value_{target}$ − $value_{current}$
      integral = integral + $error_{current}$ * dt
      derivative = ($error_{current}$ − $error_{prev}$) / dt
      output = $k_p$ * $error_{current}$ + $k_i$ * integral + $k_d$ * derivative
      // Update the RL information
      observation.record($error_{current}$, $time_{current}$) ▷ Update summary statistics of the error
      reward.update($error_{current}$; $time_{current}$)
      // Update previous information
      $time_{prev}$ = $time_{current}$
      $error_{prev}$ = $error_{current}$
      execute(output)
    end for
  end loop FIG. 2 illustrates a schematic representation of a system 200 that includes a reinforcement learning outer loop 202 that can receive as input information sensed about the environment 204, summary statistics 206 about the error terms from the PID controller 208, and a reward function 210 based on the prior changes made by the RL outer loop 202. The RL outer loop 202 can run every $freq_{RL}$ steps. The PID controller 208, however, may operate at a greater frequency, allowing it to maintain control and smooth operation. The RL outer loop 202 can use the observations, such as the environment 204 information and the summary statistics 206, to make a prediction for how a change in PID coefficients (and, for example, tunable features of the filters) may affect the process output and minimize error. In some embodiments, the PID inner loop may operate 100-10,000 times more frequently than the outer RL learning loop. For example, the PID loop may operate every ¹⁄₁₀₀₀ of a second, while the RL loop may operate once every second.

Figure 3:
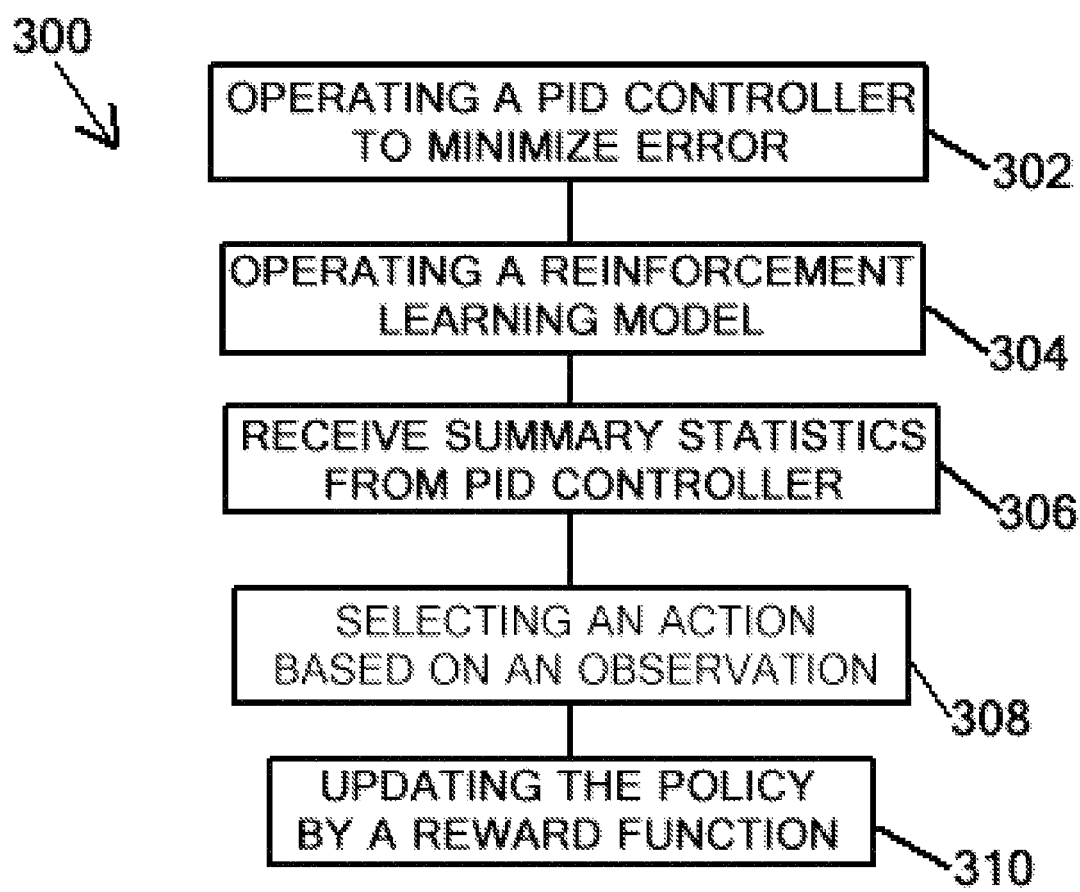
FIG. 3 illustrates a flow chart describing a method according to an exemplary embodiment of the present invention.

Referring to FIG. 3, a method 300 is illustrated according to an exemplary embodiment of the present invention. The method 300 can be used to automatically adjust the coefficients of a proportional-integral-derivative controller. The method 300 include a step 302 of operating a PID controller to minimize error between a variable setpoint and a process output. The method 300 can include a further step 304 of operating a reinforcement learning model. The reinforcement model can perform a step 306 of receiving summary statistics from the PID controller to calculate an observation. With that observation, the method 300 can perform a step 308 of selecting an action based on the observation via a policy. The policy can predict results of the action, the action including the changing PID coefficients. The method 300 can perform a step 310 of updating the policy by a reward function. The reward function can be derived from sensed information after the policy acts on the PID controller by updating the PID coefficients.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A reinforcement learning process for automatically tuning proportional-integral-derivative (PID) coefficients, the process performing the steps of:
    operating a PID controller at a first frequency to minimize an error between a variable setpoint and a process output;
    training a policy by a reward function derived from sensed information after the policy acts on the PID controller by updating the PID coefficients; and
    operating a reinforcement learning model at a second frequency, the reinforcement learning model performing the following steps:
        receiving summary statistics about error terms from the PID controller and sensed information on the environment to calculate an observation;
        selecting an action based on the observation by feeding the observation into the trained policy;
        predicting a result of taking the action, the action including changing the PID coefficients; and
        updating the policy by the reward function derived from sensed information after the policy acts on the PID controller by updating the PID coefficients.

2. The process of claim 1, wherein the reward function is derived from the summary statistics about the error terms from the PID controller.

3. The process of claim 1, wherein the action includes changing tunable parameters of filters.

4. The process of claim 1, wherein the first frequency is greater than the second frequency.

5. The process of claim 1, wherein the first frequency is 100 to 10,000 times greater than the second frequency.

6. The process of claim 1, wherein the PID controller operates continuously in real time.

7. The process of claim 1, further comprising deploying the trained policy into a production environment.

8. The process of claim 1, wherein the reward function is based on one or more of minimizing the error, minimizing control variable changes, and minimizing an overshoot.

9. A method of automatically adjusting coefficients of a proportional-integral-derivative (PID) controller, the method comprising:
    training a policy by a reward function derived from sensed information after the policy acts on the PID controller by updating the PID coefficients; and
    operating a reinforcement learning model to perform the following steps:
        receiving summary statistics about error terms from the PID controller and receiving sensed information on the environment to calculate an observation;
        selecting an action based on the observation by feeding the observation into the trained policy;
        predicting a result of taking the action, the action including changing the PID coefficients; and
        updating the policy by the reward function derived from sensed information after the policy acts on the PID controller by updating the PID coefficients.

10. The method of claim 9, further comprising operating the PID controller at a first frequency to minimize an error between a variable setpoint and a process output, the reinforcement learning model being operated at a second frequency, the second frequency being less than the first frequency.

11. The method of claim 9, wherein the reward function is derived from the summary statistics about the error terms from the PID controller.

12. The method of claim 9, wherein the action includes changing tunable parameters of filters.

13. The method of claim 10, wherein the first frequency is 100 to 10,000 times greater than the second frequency.

14. The method of claim 10, wherein the PID controller operates continuously in real time.

15. A method of automatically adjusting coefficients of a proportional-integral-derivative (PID) controller, the method comprising:
    operating the PID controller at each time step to minimize an error between a variable setpoint and a process output;
    training a policy by a reward function derived from sensed information after the policy acts on the PID controller by updating the PID coefficients; and
    operating a reinforcement learning model after a plurality of the time steps to perform the following steps:
        receiving summary statistics about error terms from the PID controller and receiving sensed information on the environment to calculate an observation; and
        selecting an action based on the observation by feeding the observation into the trained policy, the trained policy predicting results of the action.

16. The method of claim 15, wherein the reward function compares the prediction of the policy with the summary statistics about the error terms over the plurality of time steps.

17. The method of claim 15, wherein the action includes changing tunable parameters of filters.

18. The method of claim 15, wherein the plurality of time steps is 100 to 10,000 times greater than the second frequency.

19. The method of claim 15, wherein the PID controller operates continuously in real time.

20. A reinforcement learning process for automatically tuning proportional-integral-derivative (PID) coefficients, the process performing the steps of:
- operating a PID controller at a first frequency to minimize an error between a variable setpoint and a process output;
- training a policy by a reward function derived from sensed information after the policy acts on the PID controller by updating the PID coefficients; and
- operating a reinforcement learning model at a second frequency, the reinforcement learning model performing the following steps:
  - receiving summary statistics about error terms from the PID controller and sensed information on the environment to calculate an observation; and
  - selecting an action based on the observation by feeding the observation into the trained policy, the action including changing the PID coefficients, wherein the first frequency is greater than the second frequency.

21. A method of automatically adjusting coefficients of a proportional-integral-derivative (PID) controller, the method comprising:
- training a policy by a reward function derived from sensed information after the policy acts on the PID controller by updating the PID coefficients;
- operating a reinforcement learning model to perform the following steps:
  - receiving summary statistics about error terms from the PID controller and receiving sensed information on the environment to calculate an observation; and
  - selecting an action based on the observation by feeding the observation into the trained policy, the action including changing the PID coefficients; and
- operating the PID controller at a first frequency to minimize an error between a variable setpoint and a process output, the reinforcement learning model being operated at a second frequency, the second frequency being less than the first frequency.

* * * * *